March 14, 1933. J. E. BUSHNELL ET AL Re. 18,764

CONCRETE MIXING AND DISTRIBUTING APPARATUS

Original Filed June 16, 1928

INVENTORS
James E. Bushnell,
Joseph C. Lukachovic,
BY
S. J. Cox.
ATTORNEY

Reissued Mar. 14, 1933 Re. 18,764

UNITED STATES PATENT OFFICE

JAMES E. BUSHNELL, OF NORTH PLAINFIELD, AND JOSEPH C. LUKACHOVIC, OF PLAINFIELD, NEW JERSEY, ASSIGNORS TO RANSOME CONCRETE MACHINERY COMPANY, OF PLAINFIELD, NEW JERSEY, A CORPORATION OF NEW JERSEY

CONCRETE MIXING AND DISTRIBUTING APPARATUS

Original No. 1,796,282, dated March 17, 1931, Serial No. 286,032, filed June 16, 1928. Application for reissue filed October 31, 1931. Serial No. 572,416.

The improvements relate in general to apparatus for mixing and placing freshly mixed concrete and more particularly to a gravity distribution means therefor in association with a portable mixer.

The present improvements have as their primary object, among others, the provision of a mixing and distributing unit for concrete and other flowable materials, adapted to be readily positioned for use or knocked down for travel, entailing a minimum of time and labor. A further object is to provide a portable mast plant in combination with a mixing unit therefor embodying a novel means and method of erecting and lowering the former. A still further object resides in the provision of a unitary structure for accomplishing the foregoing purposes, embodying a minimum of parts, all of which contribute to the efficient functioning of the unit under all conditions of use.

Other objects and advantages will be apparent upon reference to the accompanying description and drawing in which—

Figures 1, 2:
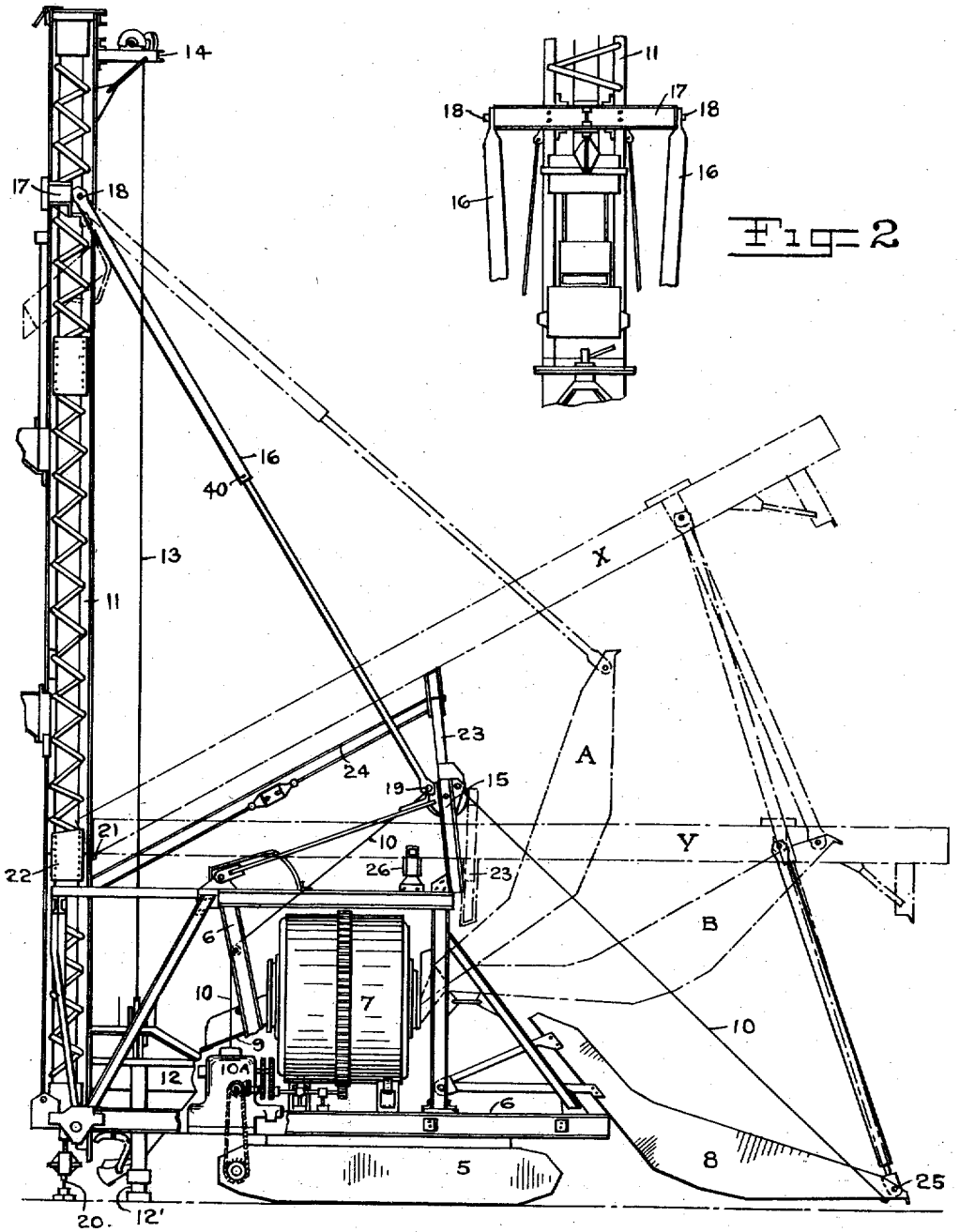
Fig. 1 is a side elevation of a paver unit embodying the present improvements, parts being broken away and others in dotted line positions.
Fig. 2 is a fragment of the mast taken at right angles to the showing of Fig. 1.

The illustrated embodiment comprises a paver unit including a traction means 5, mixer frame 6, mixing drum 7, pivoted charging skip 8, and discharge chute 9, all operated by gears, clutches (not shown), etc. through a suitable power means conventionally indicated at 10A mounted on the frame. The operation of the foregoing parts is well known. The dry aggregates, sand, cement, etc. are loaded on the skip 8, which is elevated by power cable 10 to dotted line position A, thereby discharging the ingredients into mixer 7 there to be mixed for a predetermined interval with a suitable quantity of water, whence the batch is discharged by chute 9 to a suitable receptacle.

Means for distributing the freshly mixed concrete is associated with the unit above described and comprises a mast plant 11 mounted on the mixer frame as illustrated, having a vertically moving bucket 12, adapted to receive the discharge from mixer 7 by chute 9. Cable 13 extending over sheaves on bracket 14 and down to the power means serves to elevate the bucket along the mast to the desired height, where it automatically discharges its contents to suitable chutes, etc., whence the concrete is conveyed under the influence of gravity to the point of placement. The bucket 12 may then be lowered to receive a new charge and the operation repeated as is well known in this type of apparatus. A bumper 12′ is provided for the bucket, as illustrated.

Details of the mast and bucket will not be specifically described here, as same may be of any suitable construction. That chosen for illustration however is of the type set forth in United States Letters Patent to James E. Bushnell, No. 1,645,942, issued October 18, 1927, and to John P. Faber, No. 1,812,328, issued June 30, 1931.

Mounted adjacent the forward end of the mixer frame, is a supporting member or base 15, suitably braced to withstand stresses and strains. Two such members are provided, one on each side of the frame 6, and form with said frame, a cradle in which the reclined mast 11 may be disposed as hereinafter described. As illustrated, a cross brace 17 is fixed to the mast 11 adjacent the upper limit thereof, said brace having pivotally connected thereto at 18, the upper ends of struts or braces 16. When the unit is in operative position, shown in full lines in Fig. 1, the lower ends of these struts are removably anchored at 19 to the supporting members 15 aforementioned, whereby the mast is steadied and braced during use. Suitable jacks 20 are provided at the lower rear portion of frame 6 for supporting and steadying the mast and frame when in use, but may be raised from the ground and carried when the paver is prepared for travel.

The struts 16 are of collapsible or telescopic construction for a purpose hereinafter set forth, and in the present embodiment are maintained in extended position by means of one or more removable bolts or pins 40 passing through registering apertures in the telescopic sections.

The mast 11 is pivoted at 21 to the frame 6, or a prolongation of the mast fixed to said frame, and is adapted to be moved thereabout from erect (full line) position to a reclining horizontal position (dotted line Y) for transit and vice versa. When in the upright (full line) working position, the mast may be secured to the frame by any convenient means, as for example, a bolted plate 22. Said plate, of course, will be freed of the mast upon lowering thereof to traveling position.

The supports 15 have pivotally connected thereto, the legs of a U-shaped bridge 23 which is is adapted to be swung from dotted to full line position and vice versa, either manually or by applying power to cable 24. A suitable stop is provided for the bridge 23 to prevent same from swinging in a counter clockwise direction, beyond the full line position illustrated. The forward end of the skip 8 is provided with an attaching means 25 for the lower end of struts 16 for use under predetermined conditions as hereinafter described, two such means being provided, one on each side of the skip.

When arranged for traveling, the mast 11 is disposed in the horizontal position (dotted line Y), the U-shaped bridge 23 being down in dotted line position so that the mast is disposed between the legs thereof as well as between supports 15 and rests on buffer or support 26. The struts 16 are telescoped as shown and are disposed between the reclining mast and the skip. If it is found desirable to elevate the skip to a higher position during transit, the struts 16 may be disconnected therefrom or from the mast, to permit such movement.

Upon arrival of the unit at the field of operation, the apparatus may be speedily set up for work, and no delay need be encountered while a separate mast plant is being erected, since the paver unit carries its own mast and erecting means. In accomplishing the erection of the mast, the skip 8 is placed in its lowermost position with the telescoped struts 16 attached to the parts 25 of the skip and the brace 17 of the reclined mast, as illustrated in dotted lines. Power is then applied to the skip cable 10 and the skip is raised to an intermediate position indicated by dotted lines B, and the mast 11 being raised (by means of struts 16) in a corresponding arc about its pivot 21 to the dotted line position X. When this position has been reached the U-shaped bridge 23 is swung in a counter clockwise direction about its pivot on supports 15 until it reaches full line position where it is bolted and assumes the position of an inverted U, thereby forming a bridge or support upon which mast 11 may be held in its oblique position X. Cable 24, provided with a turnbuckle, may then be anchored to the frame, as illustrated, for steadying the bridge 23.

Cable 10 is now paid out, permitting skip 8 to return to lowermost position carrying with it the lower sections of the telescopic struts, while the upper sections thereof remain secured to mast 11 which is held in position X by bridge 23. The struts 16 are accordingly extended by this operation, as illustrated in dotted lines, and pin 40 is now inserted in the registering apertures in the sections. At this stage of the erection of the mast, skip 8 is in lowermost position, mast 11 is in oblique position X and the extended struts 16 form rigid connections between the skip and mast. The final step in the erection is now accomplished by elevating the skip 8, by cable 10, to dotted line position A, whereby, (by means of struts 16) the mast 11 is raised about its pivot 21 from position X, to full line vertical position when the plates 22 are bolted to the mast for holding same. The lower ends of struts 16 are now disconnected from the skip, swung downwardly and anchored at 19 to supports 15, where they remain to brace the mast during use. The skip 8 is then lowered to lowermost position and the unit is ready for use. The securing means 25 may take any suitable form, may be mounted in any convenient position on the skip and are readily removable therefrom after the mast is erected.

When it is again desired to arrange the unit for transit, the mast is lowered from vertical position by following the above described steps in reverse order. The skip 8 is raised to and held in position A by cable 10, and the lower ends of struts 16 are disconnected at 19 and secured to the skip at 25. Fastening plates 22 are now unbolted and the skip 8 lowered by cable 10 to lowermost position carrying with it struts 16 which in turn swing mast 11 about pivot 21 to dotted line position X. If bridge 23 is not in upright full line position, it is now swung to such position for supporting mast 11. As the struts 16 are in extended position, pins 40 are removed therefrom and the struts collapsed or telescoped by elevating skip 8 to dotted line position B. Support 23 is now removed from under mast 11 and the skip lowered (supporting the mast) to lowermost position whereby mast 11 is disposed in horizontal position resting on support 26. The unit is now again adapted for transit.

It is apparent from the foregoing description that a portable construction unit has been designed embodying a combined mixer and gravity distribution means which is adapted to be set up or knocked down in a minimum time and by the employment of but a few laborers. In accomplishing the foregoing result it will be noted that novel mast erecting and lowering methods are practical utilizing means for accomplishing the methods, which means perform functions aside from that of operating the mast. No cumbersome parts have been added to the present improvements in attaining the novel construction, which will be idle or interfere with the normal operation of the plant. Accordingly the struts 16 and skip 8 after serving as a hoisting means for the mast, respectively brace the mast and load the mixer, and serve in such capacities until again called upon to lower the mast to traveling position.

Various modifications within the purview of the present improvements will be apparent to those skilled in the art and may be made without departing from the scope of the invention.

We claim:

1. In a mixing and distributing unit comprising a base member, a charging skip and distributing mast movably mounted on said base for movement relative therewith, and means cooperating between said skip and mast for erecting and lowering said mast.

2. In a mixing and distributing unit comprising a mixer and a base member, a charging skip for said mixer positioned on said member, a distributing mast pivotally mounted on said base member and means cooperating between said skip and mast for erecting or lowering said mast.

3. In a mixing and distributing unit a base member, a charging skip positioned on said member, a distributing mast pivotally mounted on said base member, means normally bracing said mast in erect position, said means being releasable for attachment with said skip to cooperate in erecting and lowering said mast, and means for attaching said bracing means to the skip.

4. In a device of the character described having a base, a mixer and charging skip mounted thereon, the combination with a distributing mast movably mounted on said base, a collapsible brace, said mast being normally held in erect position by said brace and means on said skip adapted to receive one end of said brace whereby said skip may lower said mast to inoperative position.

5. In a portable mixing device, a base, a charging skip mounted on said base, a mast pivotally mounted on said base, and a telescopic brace adapted to be connected to said mast and skip whereby movements of said skip may be imparted to said mast for raising and lowering same.

6. In a portable mixing device, a base, a charging skip mounted thereon, a distributing mast movably mounted on said base, bracing means fixed to said mast and removably connected with said base for holding said mast in erect position and means on said skip adapted to support one end of said bracing means whereby said skip may lower said mast to inoperative position.

7. In a mixing device, a base, a charging skip mounted thereon, a distributing mast movably mounted on said base, means on said skip adapted to support a rigid member and a rigid member adapted to connect said mast and said means, for supporting the mast during travel from upper to lower positions and vice versa.

8. In a paver unit including a mixer, and a pivotally mounted mast and skip, the method of raising said mast from horizontal to vertical position comprising connecting said mast and skip with a telescopic strut, raising the skip to an intermediate position, supporting the mast in such intermediate position, distending the strut by lowering the skip, securing the strut in distended position, raising the skip until the mast is erect, disconnecting the strut from the skip and anchoring same on the paver.

9. In a paver unit including a mixer, a pivoted skip therefor and a pivotally mounted mast supported in vertical position by a distended telescopic strut, the method of lowering the mast to horizontal position comprising raising the skip to elevated position, attaching the strut to the skip, lowering the skip, whereby the mast is lowered to intermediate position, supporting the mast in such position, telescoping the strut by raising the skip, removing the support for the mast and lowering the skip.

10. In a paver unit having a mixer, the combination of a collapsible mast adapted to be elevated to a position for distributing materials and lower during inactive periods, a material hoist pivotally mounted adjacent said mast, and means for operatively connecting said mast and hoist for imparting movement of the latter to the former whereby said mast may be elevated and lowered under the influence of pivotal movements of said hoist.

11. In a paver unit, the combination of a pivoted mast, a pivoted material hoist and means cooperating between said mast and hoist whereby movements of the latter influence movements of the former.

12. In a portable mixing device, a base, a charging skip mounted on said base, a mast pivotally mounted on said base for movement from reclining to vertical positions, and means for raising said mast from reclined to vertical position by elevation of said skip comprising a brace connected with said mast and detachably secured to said skip.

13. In a portable mixing and distributing unit, the combination of a base, a mast and a material hoist pivotally mounted thereon, a mixing drum mounted on said base, power actuated means for operating the said hoist and drum, and a movable rigid member connected to the mast for effecting raising and lowering thereof, said member being operatively associated with the power means for deriving movement from said power means.

14. In a portable mixing and distributing unit, the combination of a base, a mast pivotally mounted thereon, a mixing drum mounted on said base, a power unit for imparting movement to said drum, a pivot element associated with said base, a member rotatable about said pivot by movement derived from said power unit, and means connectable with said mast and with said member for elevating and lowering said mast.

15. In a portable mixing and distributing unit, the combination of a base, a mast and a mixing drum mounted thereon, power actuated means for operating the said drum and means cooperating between said mast and power means whereby the latter influences movements of the former, said cooperating means including a connecting member secured to the mast and removably connected with the base, said member being removable from said base and being operatively associated with the power means for deriving movement from said power means, and means for securing said connecting member in fixed relation to the base after the mast has been moved to upright position.

16. The combination of a base structure, traction means upon which said base is mounted, power means for operating said traction means, a mast mounted on said base structure adapted to be raised and lowered, a material elevating bucket mounted to travel along said mast, a pivotal connection between said mast and the upper portion of said base structure for affording movement of said mast to reclining position over said base structure, a mixing drum mounted on said base structure and operated by said power means, mechanism, including a pivoted member, for imparting movement to said mast, disposed between said power means and mast, and means on said base structure for supporting said mast in raised and in lowered positions on said base structure.

17. The combination of a base structure, traction means upon which said base is mounted, power means for operating said traction means, a mast mounted on said base structure adapted to be raised and lowered, a material elevating bucket mounted to travel along said mast, a pivotal connection between said mast and the upper portion of said base structure for affording movement of said mast to reclining position over said base structure, a mixing drum mounted on said base structure and operated by said power means, mechanism for imparting movement to said mast including a member pivotally mounted on said base structure, a second member pivotally attached to said mast, a releasable connection between said members, and transmission means for imparting movement from said power means to one of said members.

Witness our hands this 28th day of October, 1931, county of Middlesex, State of New Jersey.

JAMES E. BUSHNELL.
JOSEPH C. LUKACHOVIC.